Figure 1:
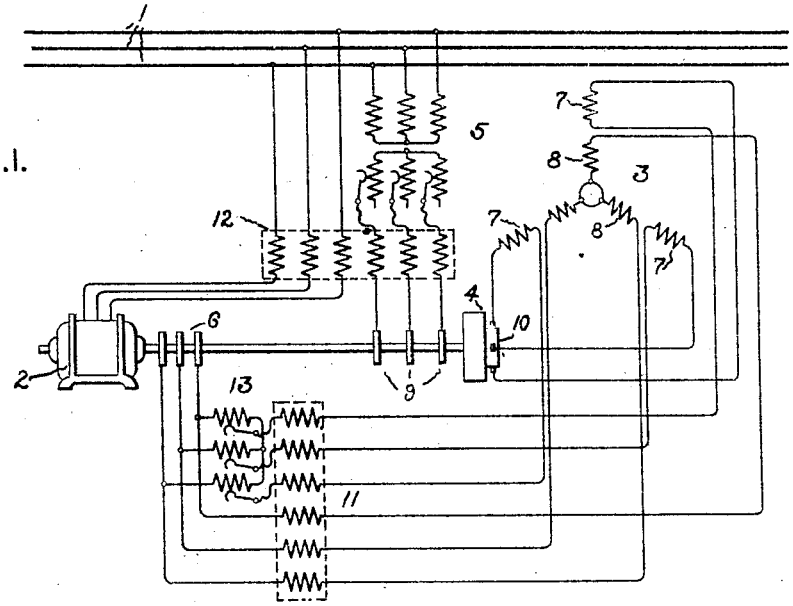

Feb. 24, 1925.

H. MEYER-DELIUS 1,527,744

CASCADE REGULATING SET FOR INDUCTION MOTORS

Filed March 6, 1922

Inventor:
Heinrich Meyer-Delius,
by Albert H. Davis
His Attorney.

Patented Feb. 24, 1925.

1,527,744

UNITED STATES PATENT OFFICE.

HEINRICH MEYER-DELIUS, OF MANNHEIM, GERMANY, ASSIGNOR TO GENERAL ELECTRIC COMPANY, A CORPORATION OF NEW YORK.

CASCADE REGULATING SET FOR INDUCTION MOTORS.

Application filed March 6, 1922. Serial No. 541,570.

To all whom it may concern:

Be it known that I, HEINRICH MEYER-DELIUS, a citizen of the German Realm, residing at Mannheim, Germany, have invented certain new and useful Improvements in Cascade Regulating Sets for Induction Motors, of which the following is a specification.

My invention relates to speed regulating means for induction motors and has for its object the provision, in connection with a system comprising an induction motor, a regulating machine concatenated therewith, and an exciting system for said machine, of new and improved methods of exciting the commutator machine whereby the desired compounding and phase compensation of the cascade may be automatically accomplished at all speeds and loads.

It is already known to operate a cascade consisting of an induction motor and a shunt commutator machine at synchronous speeds as well as speeds other than synchronism by exciting the exciting winding of the commutator machine by means of a frequency transformer supplied from the distribution network which supplies the induction motor, the transformer rotating in synchronism with the motor. It is also known to supply the excitation of the commutator machine either from the frequency transformer, from the collector side of the induction motor, or from the two in series for speeds differing from synchronism. If the motor is to operate with equal advantage at no load and at load for any desired position of its speed regulating means, then the magnitude and phase of the shunt field of the commutator machine must remain approximately constant. For every load of the motor however there corresponds a certain speed of rotation and a certain frequency in the rotor circuit. Thus, in case of variation of load, the frequency varies and with it the ratio of the resistance to the reactance in the exciting circuit, and it is impossible to keep the phase of the exciting current constant so long as a voltage of constant phase is supplying the excitation. Exciting current which is constant both as to phase and magnitude may be obtained however if the exciting winding is supplied by two voltages in series, one of which is in phase with the current and equal to the ohmic drop of this current and which therefore must be independent of the speed of rotation, and the other of which leads the current 90 degrees, is proportional to the slip frequency and is sufficient to take care of the inductive drop at all speeds. The first condition is fulfilled by correctly proportioning the potentials of the frequency transformer and the second condition is fulfilled by correctly transformed collector ring voltage. With the two voltages connected in series therefore it is possible to have the exciting current, after it is once regulated, maintain its magnitude and phase at all speeds.

It is further an expedient already known to obtain a compounding of the set by introducing into the exciting circuit of the commutator machine, by means of a series transformer, for example, a voltage which is proportional to the load current of the cascade and to the slip frequency. It is furthermore an expedient already known to obtain phase compensation of the principal motor by regulating the voltage of the commutator machine by supplying thereto an excitation obtained from the collector rings displaced 90 degrees with respect to the usual excitation, the latter of which causes a voltage in phase opposition to the collector ring voltage. These two last named systems of connection however fail at synchronism, since the collector ring voltage as well as the slip frequency are then equal to zero. The additional exciting currents necessary for compounding and phase compensation require no inductive exciting potential at synchronism, but do require a potential for overcoming their resistance drop.

The object of the present invention is to permit compounding and phase compensation at synchronism as well as at all other speeds by supplying through the frequency transformer the voltage necessary for overcoming the resistance drop of the corresponding auxiliary exciting current. It is evident that if a voltage is induced in the primary circuit of the frequency transformer which is proportional to the load on the motor and which, when transformed by the frequency converter into the exciting system of the commutator machine, leads by about 90 degrees the voltage induced directly in this exciting system by the usual method, that the resulting excitation will be what is desired for compounding and phase compensation at all speeds, the resistance drop previously mentioned being taken care of through the frequency transformer and the inductive drop by the collector ring circuit. To this end a series transformer, whose primary is located in the primary circuit of the motor and whose secondary is located in the primary circuit of the frequency transformer, may be utilized for inducing in the exciting circuit a voltage which is proportional to the primary current of the motor, and a series transformer having high magnetic resistance, whose primary is traversed by the rotor current of the motor and whose secondary is located in the exciting circuit of the commutator machine, may be utilized for inducing in said circuit a voltage which is proportional to the current and slip frequency of the motor.

Figure 2:
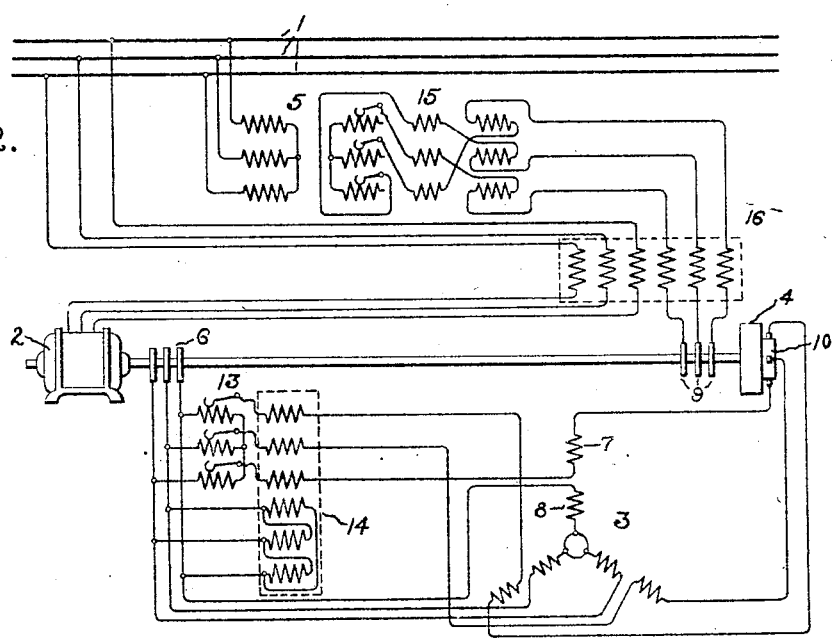

The scope of my invention will be pointed out in the appended claims while the manner in which it may be carried into effect will be explained more fully in the following description taken in connection with the accompanying drawing in which like parts are indicated by like numerals throughout and in which Figs. 1 and 2 diagrammatically represent wiring diagrams illustrative of my invention.

In Fig. 1, 1 indicates a three phase distributing system, 2 the induction motor (leading motor of the cascade), 3 the commutator machine (the following machine of the cascade), 4 a frequency transformer which is supplied through the transformer 5 from the distributing system 1. 6 indicates the collector rings of the induction motor 2, 7 the exciting winding of the commutator machine 3, 8 the compensating winding of the commutator machine 3, 9 the collector rings of the frequency transformer 4, 10 the commutator of the frequency transformer 4, 11 the compound transformer in the secondary circuit, 12 a compound transformer in the primary circuit and 13 the exciting transformer which is here shown adjustable.

The system of connections may be seen from Fig. 1. The frequency transformer may to advantage be driven from the induction motor since its secondary frequency must always coincide exactly with the slip frequency. The exciting winding 7 of the commutator machine is supplied from the exciting transformer 13 which in turn is connected to the collector ring 6. The exciting winding 7 is also supplied at the same time from the frequency transformer 4. In the exciting circuit formed by 13, 7 and 4, there is introduced by means of the compound transformer 11 a voltage which is proportional to the rotor current and frequency. The primary of the compound transformer 11 is traversed by the rotor current of the commutator machine 3. In order however to effectively obtain the desired compounding at synchronous speed and speeds in the neighborhood of synchronism a compound transformer 12 is provided on the line side of the frequency transformer. The primary current of this compound transformer is the primary current of the induction motor 2. This compound transformer induces into the primary circuit of the frequency transformer 4 a voltage which is proportional to the load current of the cascade and which is independent of the secondary frequency and which therefore is employed for taking care of the resistance losses of the exciting circuit. The transformer 5 and the compound transformer 12 are in a measure the duplicates on a reduced scale of the transformer 13 and the compound transformer 11.

The same considerations apply as regards the voltage which is to be introduced for the purpose of phase compensation. It is assumed that the primary current of the induction motor is equal and opposite in phase to the secondary current and that the primary voltage is equal to the secondary voltage divided by the slip. The two assumptions are not exactly correct since the primary current differs from the secondary current by an amount equal to the magnetizing current. Since the voltage which is introduced into the exciting circuit by the secondary circuit is proportional to the secondary current and to the slip frequency, a voltage should be introduced by the primary circuit which is proportional only to the secondary current. The voltage which is actually introduced and which is proportional to the primary current, therefore, differs from the required voltage by a constant amount and this amount may in necessary cases be introduced by a shunt transformer whose primary is connected to the distributing line and whose secondary is connected in series with the high frequency circuit of the frequency transformer. The voltage which is introduced for the purpose of phase compensation depends upon the difference between primary and secondary voltages caused by the drop of potential in the induction motor and is proportional to the current. This difference may be compensated for by inducing into the high frequency circuit of the frequency transformer a voltage which is proportional to the current of the induction motor.

In Fig. 2 there is shown an arrangement, by way of illustration, for explaining the phase compensation according to the present invention, the compounding transformer 11 and its corresponding supplementary transformer 12 being omitted for the sake of clearness. 14 represents an auxiliary transformer which introduces into the exciting circuit 13, 7 and 4 a voltage which is proportional to the slip voltage and the slip frequency, and the phase of which is so selected that it serves for the compensation of the primary phase displacement of the induction motor. This voltage however is equal to zero at synchronism and is therefore not sufficient for accomplishing phase compensation at synchronous speed. To provide for this deficiency according to the present invention a constant supplementary voltage, independent of the secondary frequency, is introduced into the primary circuit of the frequency transformer, the voltage of which has the same phase relation with respect to the principal voltage of the transformer 5 which is supplied to the frequency transformer, as the auxiliary voltage of the transformer 14 has to the exciting voltage of the transformer 13. This primarily supplied supplementary voltage may be obtained, for example, by placing on the arms of the transformer 5 supplementary coils 15 which are combined in zig-zag connection in such a manner that the desired magnitude and phase of the supplementary voltage are obtained. With these connections the primary supplementary voltage also takes care of the resistance drop of the phase compensating exciting current and causes phase compensation at synchronous speed as well as all other speeds. For the purpose of equalizing the phase difference between the primary and secondary voltages the auxiliary compound transformer 16 is employed. The secondary voltage of this transformer is proportional to the load current of the cascade. At no load operation the phase difference of the two voltages is approximately equal to zero and increases with the load. Consequently, the auxiliary compound transformer 16 is adapted to compensate for this phase difference through the frequency converter 4.

Although I have described herein a particular embodiment of my invention, by means of which the same may be practically applied, it will be understood that various modifications thereof will be evident to those skilled in the art, and, accordingly, I do not wish to be limited to the exact arrangement herein shown and described, but seek to cover in the appended claims all those modifications which come within the true scope and spirit of my invention.

What I claim as new and desire to secure by Letters Patent of the United States, is:

1. In combination, a source of supply, an asynchronous motor having its primary winding connected thereto, means adapted to vary the speed of said motor between subsynchronous and supersynchronous speeds comprising a commutator machine connected in cascade with the secondary windings of said motor, a frequency transformer, means for exciting said commutator machine from the secondary of the frequency transformer and from the secondary windings of said motor in series and automatic means associated with the primary of said frequency transformer for causing the excitation of said exciting means to have a phase compensating component proportional to the motor load at all speeds.

2. A regulating system for an induction motor comprising, in combination, a source of supply, an induction motor, having its primary winding connected thereto, a commutator machine connected in cascade with the secondary windings of said motor for regulating the speed of said induction motor between subsynchronism and supersynchronism, a frequency transformer supplied from said source, and an exciting circuit for said commutator machine supplied in series from the secondary voltages of said frequency transformer and said motor, means for inducing in said circuit a voltage proportional to the secondary current of said motor, characterized by the fact that throughout the range of operation, voltages proportional to the primary voltage and current of the induction motor are automatically induced in the primary circuit of said frequency transformer which have a ratio, with respect to the voltages induced in said exciting circuit by the secondary current and voltage of said motor for the purpose of compounding and phase compensation, substantially equal to the ratio of the ohmic resistance to the inductive resistance in said exciting circuit.

3. In combination a source of supply, an asynchronous motor having its primary winding connected thereto, a commutator machine connected in cascade with the secondary winding of said motor, a frequency transformer, driven in synchronism with said motor, having its primary supplied from said source, an exciting winding for said commutator machine adapted to be supplied in series from the secondary voltage of said frequency transformer and from the secondary voltage of said motor, means for inducing into the primary circuit of said frequency transformer a voltage proportional to the primary current of said motor and means for inducing into the primary circuit of said frequency transformer a supplemental voltage to compensate for the difference between the primary and secondary currents of said induction motor due to the magnetization current of the motor.

In witness whereof, I have hereunto set my hand this 12th day of January, 1922.

Dr. MEYER-DELIUS.